United States Patent [19]

Himes

[11] 4,279,241

[45] Jul. 21, 1981

[54] SOLAR HEAT ABSORBING AND RADIATING WALL

[76] Inventor: John W. Himes, P.O. Box 1617, Taos, N. Mex. 87571

[21] Appl. No.: 98,427

[22] Filed: Nov. 29, 1979

[51] Int. Cl.³ .............................. F24J 3/02; F28F 7/00
[52] U.S. Cl. .................................. 126/431; 126/447; 165/56; 165/185
[58] Field of Search ............... 126/447, 446, 450, 417, 126/429, 431; 165/185, 53, 55, 56

[56] References Cited

U.S. PATENT DOCUMENTS

| 842,658 | 1/1907 | Haskell | 126/449 |
|---|---|---|---|
| 3,314,414 | 4/1967 | Rowekamp | 126/450 |
| 3,893,506 | 7/1975 | Laing | 126/450 |
| 3,972,317 | 8/1976 | Gallagher | 126/450 |
| 3,987,784 | 10/1976 | Godrick | 126/450 |
| 3,996,919 | 12/1976 | Hepp | 126/429 |
| 4,015,585 | 4/1977 | Fattor | 126/438 |
| 4,016,861 | 4/1977 | Taylor | 126/449 |
| 4,026,267 | 5/1977 | Coleman | 126/449 |
| 4,058,109 | 11/1977 | Gramm | 126/422 |
| 4,083,360 | 4/1978 | Courvoisier et al. | 126/447 |
| 4,084,574 | 4/1978 | Golay | 126/449 |
| 4,108,155 | 8/1978 | Koizumi et al. | 126/429 |
| 4,114,593 | 9/1978 | Guertin | 126/450 |
| 4,149,903 | 4/1979 | Lindmayer | 126/417 |
| 4,184,476 | 1/1980 | McArthur | 126/429 |
| 4,188,941 | 2/1980 | Hopkins | 126/449 |

OTHER PUBLICATIONS

Miller, Solar Heat Pipe, Mechanix Illustrated, Dec., 1978, pp. 29-31, 118.

*Primary Examiner*—Daniel J. O'Connor
*Attorney, Agent, or Firm*—James A. Wong

[57] ABSTRACT

Building construction having at least one wall with an inner surface and an outer surface comprising in combination therewith a heat energy absorbing member disposed outwardly of the outer surface for absorbing solar heat energy, heat radiating members disposed inwardly of the inner surface, and heat transfer elements extending through the wall, the heat transfer elements being in contact with both the heat energy absorbing member and the heat radiating members whereby solar heat energy absorbed by the heat energy absorbing member may be transferred therefrom by the heat transfer elements to the heat radiating members to heat the interior of the building construction.

5 Claims, 4 Drawing Figures

SOLAR HEAT ABSORBING AND RADIATING WALL

BACKGROUND OF THE INVENTION

1. Field of the Invention

The present invention relates to a building construction or portion thereof which is of such character that solar energy falling thereon may be readily and efficiently converted to interior heating purposes. More particularly, building constructions of the type with which the present invention is most likely to be associated are believed to be found in Class 126, Subclasses 270 and 271.

2. Description of the Prior Art

The convertibility of the heat energy of the sun to immediate use is well recognized not only by any sunbather or most any school boy with a magnifying glass but also by scientists, engineers, and would-be inventors the world over, particularly in this age of high cost of fossil fuels and recognition of our diminishing resources. Efforts of the inventive community are documented by the increased number of patents presently granted, yet to date few, if any, of such patents are known to be successfully commercialized due to expected low economic returns attributable to such patented devices.

Examples of prior art efforts of harnessing solar heat energy and converting same to domestic and/or commercial use include, for example, U.S. Pat. Nos. 3,314,414 (Rowekamp); 3,893,506 (Laing); 3,972,317 (Gallagher); 3,996,919 (Hepp); and 4,015,585 (Fattor).

Of the prior art listed above, Rowekamp relates to a solar collector including an element 31 with an exterior member connected to an interior member by an intermediate member extending from the former to the latter.

Laing relates to a device for absorption and emission of heat comprising outer sheet metal surface 4 and inner sheet metal surface 5 with the latter being disposed against an insulating layer 3 located between the sheet metal plates and concrete base plate 1.

Gallagher relates to a solar heater for heating fluid passing through a plurality of solar panels disposed in side-by-side relationship.

Hepp relates to a system for collecting and storing solar energy comprising panels installed between the joists of a roof whereby the collector surface of each panel functions as part of the roof of each panel and also includes a heat storage system connected to the back side of each panel.

Fattor relates to a solar heating apparatus comprising a concrete block 100 having a plurality of water tubes 102 passing therethrough whereby heat may be transferred to or from the water and the concrete block which functions as a heat storage member.

SUMMARY OF THE INVENTION

The present invention relates to a new and improved structure for converting solar heat energy to usable heat in domestic, commercial, industrial or like buildings or enclosures.

OBJECTS OF THE INVENTION

Consistent with the summary of the invention set forth above, it is an object of the present invention to provide a new and efficient wall structure of such character as to readily and efficiently convert solar energy to usable heat for interior spaces suitable for habitation or other purposes.

It is also an object of the present invention to provide a new and improved building structure whereby solar energy may be absorbed, transferred into the building by heat conducting elements, and given off inside the building by heat radiating members.

It is another object of the present invention to provide a new and improved building structure of rather simple but functional character.

It is still another object of the present invention to provide a new and improved building structure whereby solar energy may be used for heating water.

It is yet another object of the present invention to provide a new and improved solar heating system whereby heat absorbed from the sun may be readily stored for use at a later time.

DETAILED DESCRIPTION OF THE INVENTION

Figure 1:
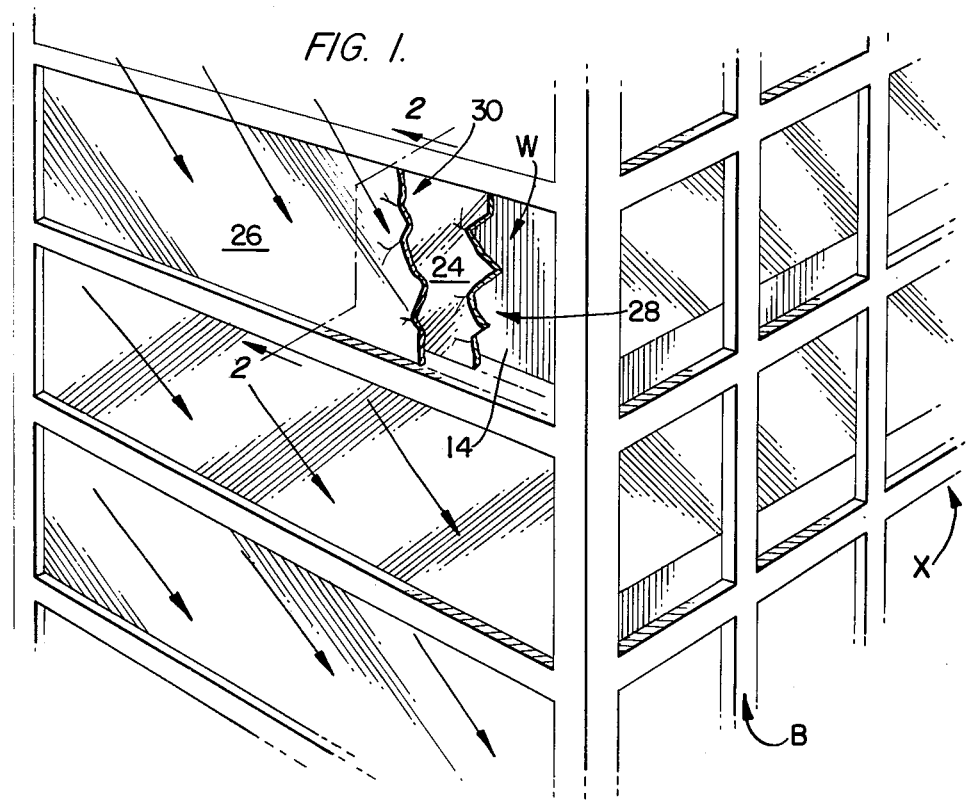
FIG. 1 represents a view in perspective of a corner of a building one side of which incorporates the inventive concept disclosed herein.

Referring now in detail to the drawings, the reader should understand that building B includes a plurality of walls W, X, and others not shown. Wall W is represented to be located on the side of building B receiving the greatest exposure to the sun and is to be understood to constitute the subject matter for which a patent is desired. Consideration of FIGS. 2 and 3 along with FIG. 1 will readily show that wall W, which has an inner surface 10 and an outer surface 12, is assembled in combination with a heat energy absorbing member 14 disposed outwardly of outer surface 12 for absorbing solar heat energy, heat radiating members 16 disposed inwardly of inner surface 10, and heat transfer elements 18 extending through wall W. Heat transfer elements 18 are in contact with both heat energy absorbing member 14 and radiating members 16 so that solar heat energy absorbed by heat energy absorbing member 14 may be transferred therefrom by heat transfer elements 18 to heat radiating members 16 to heat the interior of building B. For convenience, heat absorbing member 14 is embodied as one continuous relatively large metal plate, although it may take the form of a plurality of smaller metal plates. Heat radiating members 16, on the other hand, comprise an array of relatively smaller metal plates, but may be in the form of a single large plate. Heat transfer elements 18 are embodied as a plurality of metal rods, bars, or like members. Wall W is of concrete or like material which will inherently function to store a substantial amount of the heat absorbed by absorbing member 14. The heat stored by wall W when the sun is shining on heat absorbing member 14 will be given off and returned to the system after the sun sets or otherwise ceases to shine.

Figure 2:
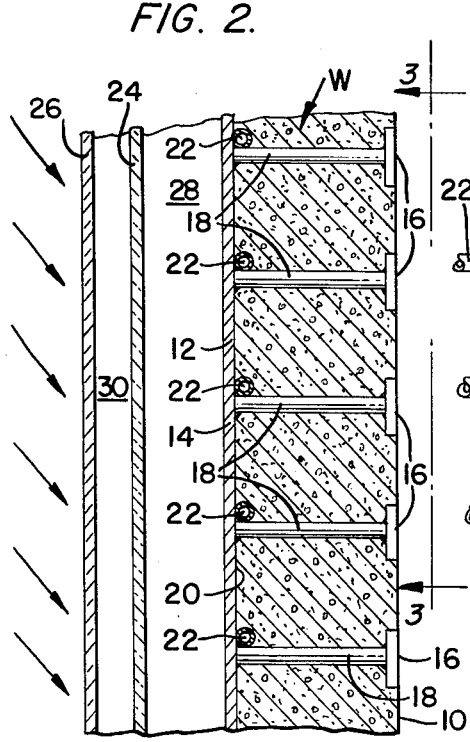
FIG. 2 is a sectional view of my invention taken along the plane 2—2 and looking in the direction of the arrows in FIG. 1.
Figure 3:
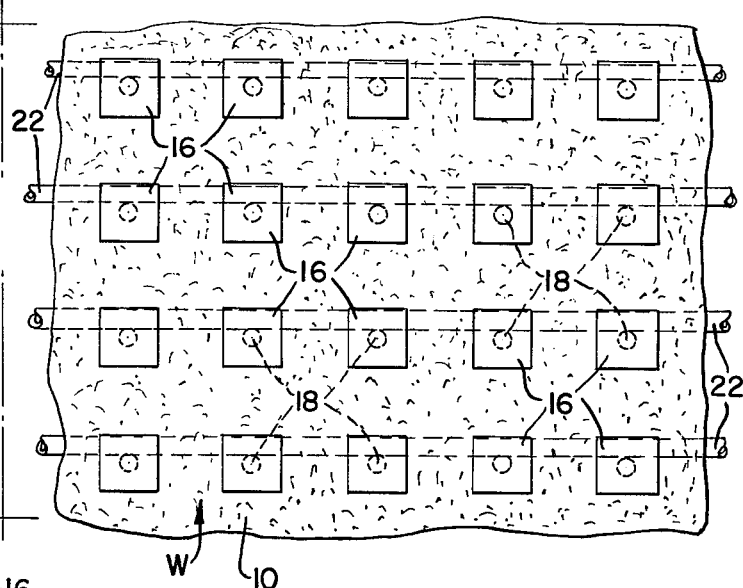
FIG. 3 is a view of my invention taken along the plane 3—3 and looking in the direction of the arrows in FIG. 2.

As may be clearly seen in FIG. 2, large metal plate 14, which constitutes the heat absorbing or collector member, includes an inner surface 20 disposed in actual or substantial abutment against outer surface 12 of wall W. One or more pipes 22 through which water may flow or in which water may be stored are embedded in wall W adjacent to the inner surface 20 of relatively large metal plate 14 and adjacent at least one of the plurality of metal rods, bars, or like members 18 whereby the water in pipes 22 may be heated. Depending upon the amount of water contained in pipes 22 or flowing through pipes 22, the amount of heat stored or taken out of the system may be controlled. Also, the heated water in pipes 22 may be used for whatever purpose such heated water may be needed.

Wall W, for example, may be the exterior wall for a utility room of a home in which one of the pipes 22 may be tapped so that water heated therein by solar heat may be put to general use. Consistent with conventional plumbing practice, pipes 22 may be of copper. With pipes 22 located closely adjacent to inner surface 20 of large metal plate 14, water in pipes 22 can be heated to about 110° F. as pipes 22 themselves or other metal parts may be heated up to about 130° F. when exposed to direct sunlight for a period of three hours.

Figure 4:
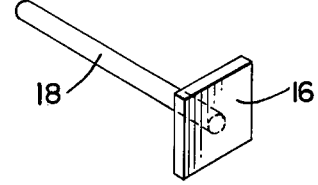
FIG. 4 is a view in perspective of a subassembly of two essential elements which form part of my invention.

As may be seen in FIG. 4, each heat transfer element 18 may be in the form of a solid metal rod assembled, for example by being welded, on a metal heat radiating member 16 prior to being installed in combination with wall W. When heat transfer elements 18 and heat radiating members 16 are installed in wall W, each heat radiating member 16 is partially embedded in wall W with an inner surface being flushed with the inner surface 10 of wall W so as to be exposed to the interior space enclosed by wall W to thereby heat such interior space.

The continuously relatively large metal plate 14, for example, may be of steel and is painted black to ensure maximum absorptivity and is further combined with glass panes 24, 26 disposed externally thereof, extending generally parallel therewith, and enclosing a first air space 28 between one of the glass panes 24 and the outer surface of the continuous relatively large metal plate 14 and enclosing a second air space 30 between the glass panes 24, 26 themselves.

It will be obvious to those skilled in the art that various changes may be made without departing from the scope of the invention and the invention is not to be considered limited to what is shown in the drawings and described in the specification.

What is claimed is:

1. Building construction having at least one wall of concrete or like material with an inner surface and an outer surface comprising in combination therewith heat energy absorbing means in the form of at least one continuous relatively large metal plate disposed outwardly of said outer surface for absorbing solar heat energy; heat radiating means in the form of an array of relatively smaller metal plates disposed inwardly of said inner surface; and heat transfer means in the form of a plurality of solid metal rods, bars, or like members without openings therein extending through said wall; characterized in that said heat transfer means is in contact with both said heat energy absorbing means and said heat radiating means whereby solar heat energy absorbed by said heat absorbing means may be transferred therefrom by said heat transfer means to said heat radiating means to heat the interior of said building construction, and said wall is in actual or substantial abutment with both said heat energy absorbing means and said heat radiating means.

2. Building construction as defined in claim 1, wherein one or more pipes through which water may flow are embedded in said wall adjacent to the inner surface of said relatively large metal plate and at least one of said plurality of metal rods, bars, or like members whereby water flowing in said pipes may be heated.

3. Building construction as defined in claim 2, wherein said continuous relatively large metal plate is steel and is painted black.

4. Building construction as defined in claim 1, comprising in further combination therewith at least two glass panes extending generally parallel to said continuous relatively large metal plate and enclosing a first air space between one of said glass panes and the outer surface of said continuous relatively large metal plate and enclosing a second air space between said glass panes themselves.

5. Building construction having at least one wall with an inner surface and an outer surface comprising in combination therewith heat energy absorbing means disposed outwardly of said outer surface for absorbing solar heat energy, heat radiating means in the form of an array of relatively small metal plates disposed inwardly of and abutting said inner surface in flat fashion, and heat transfer means in the form of a plurality of solid metal rods, bars, or like rod members without openings therein extending through said wall, said heat transfer means being in contact with both said heat energy absorbing means and said heat radiating means whereby solar heat energy absorbed by said heat energy absorbing means may be transferred therefrom by said heat transfer means to said heat radiating means to heat the interior of said building construction; wherein said heat absorbing means comprises at least one continuous relatively large metal plate; said wall is of concrete or like material; said relatively large metal plate includes an inner surface disposed in substantial abutment against said outer surface of said wall, and one or more pipes through which water may flow are embedded in said wall adjacent to the inner surface of said relatively large metal plate and at least one of said plurality of metal rods, bars, or like members whereby water flowing in said pipes may be heated; said continuous relatively large metal plate is steel and is painted black; said building construction having in further combination therewith at least two glass panes extending generally parallel to said continuous relatively large metal plate and enclosing a first air space between one of said glass panes and the outer surface of said continuous relatively large metal plate and enclosing a second air space between said glass panes themselves.

* * * * *